UNITED STATES PATENT OFFICE 2,080,209

AZO-DYESTUFF

Markus Kappeler, Basel, Switzerland, assignor to the firm of Chemical Works Formerly Sandoz, Basel, Switzerland No Drawing. Application November 16, 1935, Serial No. 50,239. In Switzerland November 22, 1934

7 Claims. (Cl. 260—78)

The present invention relates to azo-dyestuffs which are fast to light and to acid milling and to processes for their manufacture.

It has been found that new valuable polyazo-dyestuffs can be prepared by combining diazotized diaminodiaryldisulphonic acids, their homologues or their monoacylated derivatives, on the one hand, with a coupling component containing at least one sulphonic acid group and selected from the class consisting of arylpyrazolones, naphtholsulphonic and N-acyl- or N-arylaminonaphtholsulphonic acids, and on the other hand, with a phenol or its homologues and derivatives, and eventually by subjecting the dyestuffs thus obtained to an acylating operation in order to acylate the phenolic hydroxy group.

As diaminodiaryldisulphonic acids that are preferably employed for the preparation of the dyestuffs herein claimed, the following compounds may for example be cited: benzidine-2,2'- and -3,3'-disulphonic acids, dichlorobenzidine-disulphonic acids, tolidinedisulphonic acids, dianisidinedisulphonic acids, 4,4'-diamino-5,5'-dicarboxydiphenyl-2,2'-disulphonic acids and their monoacylated compounds.

As coupling components containing at least one sulpho group the following compounds can be used: 1-(4'-sulphophenyl)-3-methylpyrazolone, 1-(4'-sulpho-2',5'-dichlorophenyl)-3-methylpyrazolone, 1-(3'-sulpho-4'-chlorophenyl)-3-methylpyrazolone, 1-hydroxynaphthalene-3- or -4- or -5-monosulphonic acid, 1-hydroxynaphthalene-4-chloro-8-sulphonic acid, 1-hydroxynaphthalene-3,6- or -3,8-disulphonic acid, 1-hydroxynaphthalene-3- or -4-phenyl-sulphone-8-sulphonic acid, 2-hydroxynaphthalene-6- or -7- or -8-monosulphonic acid, 2-hydroxnaphthalene-3, 6- or -6,8-disulphonic acid, monotoluenesulphonylchromo-5-monosulphonic acid, 1-hydroxynaphthalene-4-lene-6-sulphonic acid, 2-phenylamino-8-hydroxynaphthalene-6-sulphonic acid, N-acetyl- or N-toluenesulphonyl-1-amino-8-hydroxynaphthalene-3,6-disulphonic acid and other similar compounds.

As second coupling component that belongs to the phenol class the following compounds can be used: phenol, ortho-, meta- and para-cresol, salicylic acid, o-cresotinic acid and other similar compounds.

The diazotation of the diaminodiaryldisulphonic acids can be carried out in the known manner, whereby only one amino- or both amino groups can be transformed into the diazo group. If the diazotation is carried out in such a manner that only a monodiazo-compound is produced, the same will be copulated with the sulphonated coupling component and the monoazo dyestuff thus obtained subjected to a second diazotizing operation previous to copulation with a phenol. If both amino groups of the diaryl compound have been diazotized, the first copulating operation is carried out with an exactly mono-molecular quantity of the sulphonated coupling component and the monoazodiazo-dyestuff thus intermediately obtained is copulated generally in the same bath with the phenol. If aminoacylamino-diaryl compounds are used as starting material, the copulation with the second coupling component will be carried out after saponification of the acylaminomonoazo-dyestuff intermediately obtained.

It is clear that by varying the coupling components a great number of disazo dyestuffs can be prepared, which are all characterized by an excellent fastness to light and by good behaviour towards acid milling. The disazo-dyestuffs still containing a free phenolic hydroxy group show in their dyeings a certain sensitivity towards acids, but they still support an acid milling without undergoing any change of their shade. This fastness to acid can remarkably be improved by treating such disazo-dyestuffs with arylsulphochlorides in such a manner that the phenolic hydroxy-group becomes esterified. This treatment can generally be carried out with acylating agents such as p-toluenesulphochloride and in presence of acid binding agents.

The dyestuffs prepared according to the processes herein above described can be isolated from their solution by salting them out or by precipitating them by means of acids. According to the method used for their isolation they can be obtained in a pure crystallized state and in a high degree of concentration. They are generally easily soluble in water and dye animal fibres fast yellow, orange, red and brown shades of excellent fastness properties.

One object of the present invention is, therefore, the disazo-dyestuffs of the general formula:

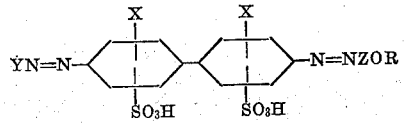

wherein both Xs represent hydrogen, chlorine, alkyl, alkoxy or carboxy groups, Y represents a coupling component containing at least one sulphonic acid group and selected from the class consisting of arylpyrazolones and naphtholsulphonic acids, Z represents a benzene nucleus and R represents hydrogen or a toluolsulphonyl radical, which dyestuffs are generally easily soluble in water and are capable of dyeing animal fibres yellow to brown shades of excellent fastness to light and to acid milling.

Still another object of the present invention is the processes for the manufacture of the disazo-dyestuffs of the above general formula, which processes have already been described above and will be particularly described in the following examples, the parts being by weight.

*Example 1*

37.2 parts of finely divided 3,3'-dimethylbenzidine-6,6'-disulphonic acid are suspended in 200 parts of water and a solution of 6.9 parts of sodium nitrite is added thereto at 15–20° C. After the nitrite reaction has disappeared, the brown solution is acidulated with hydrochloric acid to Congo acid reaction, whereby it becomes nearly colorless. The diazo solution thus obtained is then allowed to run at 0° C. under stirring into a solution of 9.4 parts of phenol and 50 parts of sodium carbonate in 200 parts of water, whereby copulation takes place immediately. The dyestuff thus obtained is then isolated in the usual manner, for example by salting it out or by addition of acid, and is thus obtained in form of a paste of yellow crystals. The acid sodium salt of this amino-azo-dyestuff is characterized by its great crystallization capacity and can easily be obtained in a very pure state if recovered as follows: The product obtained as above described is dissolved for this purpose in 500 parts of a 3% sodium chloride solution under addition of soda lye sufficient to produce a weak alkaline reaction, heated up to 75° C. and acidulated to Congo acid; the acid sodium salt then crystallizes immediately out in form of well formed yellow prisms, which can be separated from the warm mother lye without appreciable loss.

In order to prepare the desired disazo-dyestuff, 49.9 parts of the acid sodium salt obtained as above described are dissolved in 200 parts of water under addition of caustic soda to weak alkaline reaction; 6.9 parts of sodium nitrite are then added thereto and the solution thus obtained is allowed to run into about 150 parts of water of 10–20° C. containing 30 parts of concentrated hydrochloric acid. The diazo-compound precipitates immediately as a dark crystalline powder, if desired, can be separated by filtration. This suspension of the diazo-compound is then introduced at 0° C. into a soda-alkaline solution of 32.3 parts of 1-(4'-sulpho-2',5'-dichlorophenyl)-3-methylpyrazolone, whereby the disazo-dyestuff is formed, crystallizing out in form of beautiful prisms. The dyestuff is then separated by filtration and treated in presence of sodium carbonate with p-toluenesulphochloride until it becomes fast to acids.

The dyestuff obtained in this manner possesses the formula:

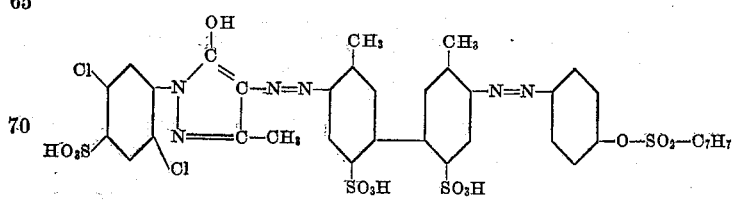

and dyes wool and hair pure yellow shades fast to light and to acid milling.

*Example 2*

37.2 parts of 3,3'-dimethylbenzidine-6,6'-disulphonic acid are partially diazotized (for instance in the manner above described), copulated with 9.4 parts of phenol, the acid sodium salt of the amino-azo-dyestuff is isolated and diazotized as above described. By adding the suspension of the diazo-compound at 0° C. to a solution of 31.5 parts of 2-phenylamino-8-hydroxynaphthalene-6-sulphonic acid containing an excess of sodium carbonate, the disazo-dyestuff is formed and can be isolated in the usual manner.

It possesses the formula:

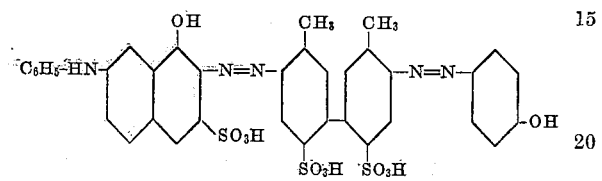

and dyes wool and hair brown shades fast to light and to acid milling.

*Example 3*

43.2 parts of 4,4'-diamino-5,5'-dicarboxydiphenyl-2,2'-disulphonic acid are dissolved in water and caustic soda and diazotized in the usual manner by the indirect method with 13.8 parts of sodium nitrite and the necessary quantity of hydrochloric acid.

To the suspension of the tetrazo-compound thus obtained there is added under good stirring a solution of 30.2 parts of 2-hydroxynaphthalene-6,8-disulphonic acid, the reaction mixture is rendered weak alkaline with sodium bicarbonate and stirred until the tetrazo-compound has disappeared. If this point is reached, a solution of 10 parts of phenol and 10 parts of sodium carbonate are added to the reaction mixture, whereby the intermediate product disappears very rapidly and yields the disazo-dyestuff. By heating the solution up to 70° C. after having added thereto 10–15 per cent of potassium chloride and by carefully acidulating it with hydrochloric acid, the dyestuff crystallizes out on cooling down in form of beautiful prisms. By treating it with p-toluenesulphochloride at 50–60° C. and in the presence of sodium carbonate, the phenolic hydroxy-group becomes esterified. The dyestuff thus obtained possesses the formula:

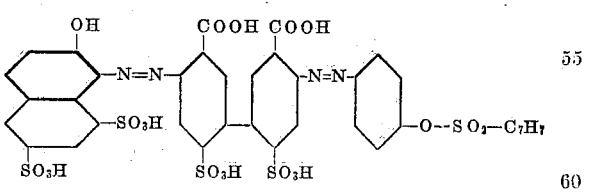

and dyes wool orange shades of excellent fastness to light and good fastness to acid milling. By after-chroming brown shades of excellent fastness to light and to milling will be obtained.

*Example 4*

37.2 parts of 3,3'-dimethylbenzidine-6,6'-disulphonic acid are tetrazotized in the usual manner and first copulated with 30.4 parts of 2-hydroxynaphthalene-6,8-disulphonic acid in presence of sodium carbonate. The intermediate product which crystallizes out in form of red needles is then copulated with 9.4 parts of phenol. The disazo-dyestuff thus obtained dyes wool pure yellowish red shades of excellent fastness to light and to acid milling. In order to render the dyestuff absolutely fast to acids, it is treated with p-toluenesulphochloride in presence of sodium carbonate until a test shows that it became completely fast to acids.

The dyestuff thus obtained possesses the formula:

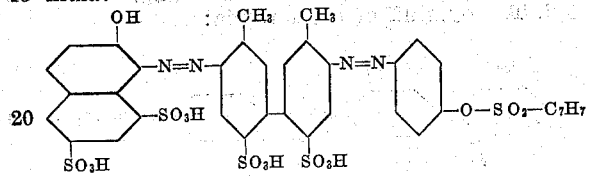

and dyes wool and hair pure yellowish-red shades of excellent fastness to light and to acid milling.

*Example 5*

37.2 parts of 3,3'-dimethylbenzidine-6,6'-disulphonic acid are dissolved under addition of caustic soda in 200 parts of water, and 13.8 parts of sodium nitrite are added to this solution, which is then allowed to run into 400 parts of a 20 per cent sodium chloride solution containing 50 parts of concentrated hydrochloric acid. The tetrazo-solution obtained in this manner is then mixed with a neutral solution of 22.4 parts of 1-hydroxynaphthalene-4-sulphonic acid, and the excess of acid is neutralized with sodium carbonate or bicarbonate, or magnesium carbonate or with another acid binding agent, whereby a thick paste due to the formation of the intermediate product will be obtained. After stirring at 0–5° C. during 1–2 hours and after a test shows that the tetrazo-compound has completely disappeared, a solution of 9.4 parts of phenol and 10 parts of sodium carbonate are added thereto, whereby the formation of the disazo-dyestuff occurs very rapidly. By salting it out, it can be completely separated from the mother lye and gives on crystallization from a 10 per cent solution of sodium chloride dark red prisms.

The dyestuff thus obtained possesses the formula:

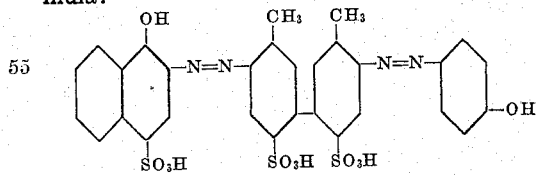

and dyes wool and hair brilliant red shades of good fastness to light and to acid milling.

*Example 6*

77.8 parts of the disazo-dyestuffs obtained as described in Example 5 are dissolved at 50° C. in 2000 parts of a 4–5 per cent sodium chloride solution; 20 parts of sodium bicarbonate are added thereto and the solution thus obtained is treated with 20–25 parts of p-toluene-sulphochloride which is added by portions, until a test shows that the dyestuff became fast to acids. The esterified product begins to crystallize out during this treatment and can be obtained in form of beautiful pale red prisms after cooling down. By using in this example 50–60 parts of p-toluenesulphochloride and by working at 60–70° C., it becomes possible to esterify both hydroxy-groups one of which is contained in the phenol and the other in the naphthol radical. The dyestuff thus prepared dyes wool orange shades. By a short boiling of this diacylated dyestuff with caustic soda solution, the ester group contained in the naphthalene radical becomes saponified and a mono-acylated dyestuff will be obtained.

The same possesses the formula:

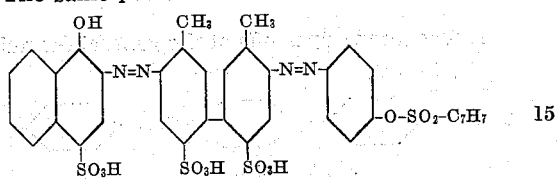

and dyes wool and hair a brilliant scarlet-red fast to acids, to light and to acid milling.

What I claim is:—

1. The disazo-dyestuffs of the following general formula

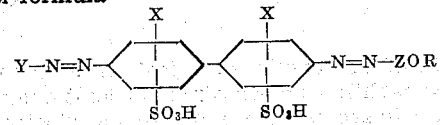

wherein both X's represent a substituent selected from the class consisting of hydrogen, chlorine, alkyl, alkoxy and carboxy groups, Y represents a radical of a coupling component containing at least one sulphonic acid group and selected from the class consisting of arylpyrazolones and naphtholsulphonic acids, N-acyl- and N-arylaminonaphtholsulphonic acids, Z represents a benzene nucleus and R represents a substituent selected from the group consisting of hydrogen and a toluolsulphonyl-radical, which dyestuffs are water-soluble compounds dyeing animal fibres yellow, orange, red to brown shades of good fastness to light and to acid milling.

2. The diazo-dyestuffs of the following general formula:

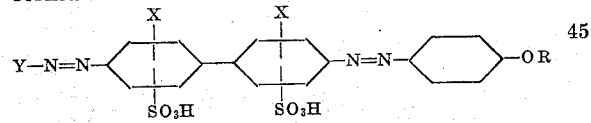

wherein both X's represent a substituent selected from the class consisting of hydrogen, chlorine, alkyl, alkoxy and carboxy groups, Y represents a radical of a coupling component containing at least one sulphonic acid group and selected from the class consisting of arylpyrazolones and naphtholsulphonic acids, N-acyl- and N-arylaminonaphtholsulphonic acids and R represents a substituent selected from the group consisting of hydrogen and a toluolsulfonyl-radical, which dyestuffs are water-soluble compounds dyeing animal fibres yellow, orange, red to brown shades of good fastness to light and to acid milling.

3. The disazo-dyestuffs of the following general formula

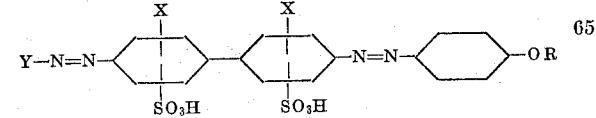

wherein X represents a substituent selected from the class consisting of hydrogen, chlorine, alkyl, alkoxy and carboxy groups, Y represents a radical of a coupled hydroxynaphthalene containing at least one sulphonic acid group and R represents a substituent selected from the group consisting of hydrogen and a toluolsulfonyl radical, which dyestuffs are water-soluble compounds dyeing animal fibres yellow, orange, red to brown shades of good fastness to light and to acid milling.

4. The disazo-dyestuffs of the general formula:

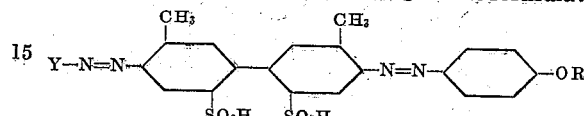

wherein Y represents a radical of a coupled hydroxynaphthalene containing at least one sulphonic acid group and R represents a substituent selected from the group consisting of hydrogen and a toluolsulphonyl radical, which dyestuffs are water-soluble compounds dyeing animal fibres yellow, orange, red to brown shades of good fastness to light and to acid milling.

5. The dyestuff of the formula:

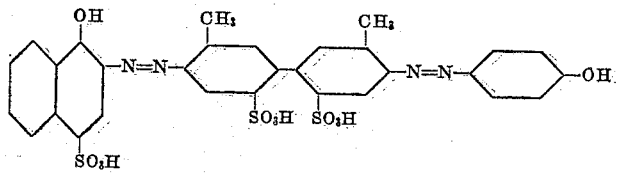

which crystallizes out in form of dark red prisms and dyes wool and hair brilliant red shades of good fastness to light and to acid milling.

6. The dyestuff of the formula:

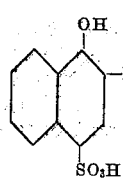

which crystallizes out in form of pale red prisms and dyes wool and hair brilliant scarlet-red shades fast to acids, to light and to acid milling.

7. The dyestuff of the formula:

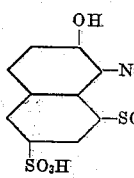

which dyes wool and hair pure yellowish-red shades of excellent fastness to light and to acid milling.

MARKUS KAPPELER.

CERTIFICATE OF CORRECTION.

Patent No. 2,080,209. May 11, 1937.

MARKUS KAPPELER.

It is hereby certified that error appears in the printed specification of the above numbered patent requiring correction as follows: Page 1, first column, lines 38, 39 and 40, for "monotoluenesulphonylchromo-5-monosulphonic acid, 1-hydroxynaphthalene-4-1ene-6-sulphonic acid," read monotoluenesulphonylchromotropic acid, 2-acetylamino-8-hydroxy-naphthalene-6-sulphonic acid,; page 3, first column, line 64, for "disazo-dyestuffs" read disazo-dyestuff; and that the said Letters Patent should be read with these corrections therein that the same may conform to the record of the case in the Patent Office.

Signed and sealed this 31st day of August, A. D. 1937.

Leslie Frazer (Seal)

Acting Commissioner of Patents.